(12) United States Patent
Okamoto et al.

(10) Patent No.: US 8,048,389 B2
(45) Date of Patent: Nov. 1, 2011

(54) CERIUM OXIDE-ZIRCONIUM OXIDE-BASED MIXED OXIDE AND METHOD FOR PRODUCING THEREOF

(75) Inventors: Hiroshi Okamoto, Osaka (JP); Masatoshi Maruki, Osaka (JP)

(73) Assignee: Daiichi Kigenso Kagaku Kogyo Co., Ltd., Osaka-shi, Osaka-fu (JP)

( * ) Notice: Subject to any disclaimer, the term of this patent is extended or adjusted under 35 U.S.C. 154(b) by 0 days.

(21) Appl. No.: 12/887,166

(22) Filed: Sep. 21, 2010

(65) Prior Publication Data

US 2011/0071017 A1   Mar. 24, 2011

Related U.S. Application Data

(63) Continuation of application No. 11/819,557, filed on Jun. 28, 2007, now abandoned.

(30) Foreign Application Priority Data

Jun. 30, 2006 (JP) .................................. 2006-207112

(51) Int. Cl.
    C01F 17/00   (2006.01)
    C01G 25/02   (2006.01)
    B01J 23/10   (2006.01)

(52) U.S. Cl. ............. 423/21.1; 423/69; 423/71; 423/84; 423/594.12; 423/608; 502/302; 502/303; 502/304; 502/349

(58) Field of Classification Search .................. 423/21.1, 423/69, 71, 411, 594.12, 608, 84; 502/302–304, 502/349

See application file for complete search history.

(56) References Cited

U.S. PATENT DOCUMENTS

| | | | |
|---|---|---|---|
| 4,940,685 A | 7/1990 | Sauvion et al. | |
| 6,150,299 A * | 11/2000 | Umemoto et al. | ............ 502/304 |
| 6,228,799 B1 | 5/2001 | Aubert et al. | |
| 6,255,242 B1 | 7/2001 | Umemoto et al. | |
| 6,797,668 B2 | 9/2004 | Yoshikawa | |
| 2006/0270883 A1* | 11/2006 | Vartuli et al. | ................ 585/639 |
| 2007/0148072 A1 | 6/2007 | Okamoto et al. | |
| 2010/0021364 A1 | 1/2010 | Okamoto et al. | |

FOREIGN PATENT DOCUMENTS

EP   0709351 A1   5/1996
EP   1035074 A1   9/2000

(Continued)

OTHER PUBLICATIONS

European Search Report dated Jun. 30, 2010, issued in corresponding European Patent Application No. 07111085.2.

(Continued)

*Primary Examiner* — Stanley Silverman
*Assistant Examiner* — Diana J Liao
(74) *Attorney, Agent, or Firm* — Westerman, Hattori, Daniels & Adrian, LLP

(57) ABSTRACT

The present invention provides a cerium oxide-zirconium oxide-based mixed oxide having superior platinum dispersibility and a suitable OSC, and a simple production process thereof. The cerium oxide-zirconium oxide-based mixed oxide comprises cerium oxide and zirconium oxide, wherein (1) the weight ratio of $CeO_2:ZrO_2$ is 60:40 to 90:10, and (2) the cerium oxide and the zirconium oxide are present as a mixture, the zirconium oxide being composed of a solid solution in which tetragonal or cubic zirconium oxide contains cerium.

5 Claims, 4 Drawing Sheets

FOREIGN PATENT DOCUMENTS

| | | |
|---|---|---|
| EP | 1803686 A1 | 7/2007 |
| JP | 6-74145 B2 | 9/1994 |
| JP | 2002-177781 A | 6/2002 |
| JP | 3623517 B2 | 2/2005 |
| JP | 2005-314134 A | 11/2005 |
| WO | 03/053852 A1 | 7/2003 |
| WO | 2005/102524 A1 | 11/2005 |

OTHER PUBLICATIONS

English Translation of WO 03/053852, Jul. 3, 2003.
Office Action dated Nov. 17, 2009, issued in U.S. Appl. No. 11/819,557.
Office Action dated Jun. 21, 2010, issued in U.S. Appl. No. 11/819,557.

* cited by examiner

CERIUM OXIDE-ZIRCONIUM OXIDE-BASED MIXED OXIDE AND METHOD FOR PRODUCING THEREOF

CROSS-REFERENCE TO RELATED APPLICATIONS

This application is a continuation of U.S. application Ser. No. 11/819,557, filed on Jun. 28, 2007 which is based upon and claims the benefit of priority from the prior Japanese Patent Application No. 2006-207112, filed on Jun. 30, 2006, the entire contents of which are incorporated herein by reference.

FIELD OF THE INVENTION

The present invention relates to a cerium oxide-zirconium oxide-based mixed oxide and a production process thereof.

BACKGROUND OF THE INVENTION

Since the oxidation-reduction potential of $Ce^{4+}$ and $Ce^{3+}$ is small at about 1.6 V and the reaction represented by the following formula proceeds reversibly, cerium oxide has an oxygen storage capacity (OSC), and is used as a co-catalyst or catalyst support of automotive three-way catalysts.

$$CeO_2 \leftrightarrow CeO_{2-x} + X/2 O_2 \;(X=0 \text{ to } 0.5)$$

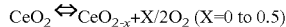

However, the OSC of pure cerium oxide is well known to be extremely low at about X=0.005.

Thus, in order to improve this, there have been numerous reports describing (1) improving the heat resistance of the specific surface area of cerium oxide, and (2) improving the OSC by inserting $Zr^{4+}$ having a small ionic radius into a Ce backbone to alleviate the increase in volume during the above-mentioned reaction, by putting zirconium oxide into a solid solution with cerium oxide.

On the other hand, in the case of using pure cerium oxide as a co-catalyst or catalyst support of an automotive three-way catalyst, the dispersibility thereof is extremely good in the case of loading with a precious metal, and particularly platinum. Namely, it is a known fact that the cerium oxide has the superior characteristic of being able to inhibit aggregation of platinum particles at high temperatures.

Therefore, there has recently been a demand for a cerium oxide-zirconium oxide-based mixed oxide having both of these characteristics.

Japanese Examined Patent Publication No. H06-74145 describes a "composition mainly consisting of ceric oxide having a stabilized specific surface area, comprising ceric oxide and at least one type of additive at a ratio of 1 to 20% by weight, wherein the additive is an oxide of one or more types of other metal elements A selected from the group consisting of silicon, zirconium and thorium".

However, only the heat resistance of ceric oxide containing 2.5% zirconia is described in the examples.

In addition, Japanese Patent No. 3623517 describes a "composition composed of cerium oxide and zirconium oxide having an atomic ratio of cerium/zirconium of at least 1 and demonstrating a specific surface area of at least 35 $m^2/g$ after being calcined for 6 hours at 900° C. and an oxygen storage capacity of at least 1.5 ml/g $O_2$ at 400° C.".

However, there is no description regarding the dispersibility of platinum.

On the other hand, Japanese Patent Application Publication No. 2002-177781 describes an "exhaust gas purification catalyst comprising a mixed oxide (B) comprised of cerium oxide loaded onto a solid solution oxide (A) containing zirconium and cerium".

However, this catalyst has a unique structure in which cerium oxide is loaded around a solid solution oxide (A) containing zirconium and cerium, and what is more, there are no descriptions whatsoever regarding the OSC and platinum dispersibility thereof.

Moreover, Japanese Patent Application Publication No. 2005-314134 describes "metal oxide particles having a core portion containing a comparatively large amount of a ceria-zirconia solid solution and a shell portion containing a comparatively large amount of a second metal oxide", and a "production process of metal oxide particles having a core portion containing a comparatively large amount of a ceria-zirconia solid solution and a shell portion containing a comparatively large amount of a second metal oxide that provides a sol containing colloidal particles of a ceria-zirconia solid solution and colloidal particles of a second metal oxide each having different isoelectric points, comprising making the pH of the sol closer to the isoelectric point of the colloidal particles of the ceria-zirconia solid solution than the isoelectric point of the colloidal particles of the second metal oxide, aggregating the colloidal particles of the ceria-zirconia solid solution, making the pH of the sol closer to the isoelectric point of the colloidal particles of the second metal oxide than the isoelectric point of the colloidal particles of the ceria-zirconia solid solution, aggregating the colloidal particles of the second metal oxide around the aggregated colloidal particles of the ceria-zirconia solid solution, and drying and firing the resulting aggregate".

However, although there are descriptions relating to OSC and platinum dispersibility, the shell portion and core portion are characterized by both being in the form of ceria-zirconia solid solutions, and the production process is extremely unique.

SUMMARY OF THE INVENTION

With the foregoing in view, an object of the present invention is to provide a cerium oxide-zirconium oxide-based mixed oxide having superior platinum dispersibility and a suitable OSC, and a simple production process thereof.

As a result of conducting extensive studies to achieve the above-mentioned object, the inventors of the present invention unexpectedly found that by adding a cerium salt and a zirconium salt to a slurry containing a cerous sulfate-alkali metal mixed salt, adding an alkali thereto to obtain a mixed hydroxide containing cerium hydroxide and zirconium hydroxide, followed by subjecting this to heat treatment to obtain a mixed oxide comprising cerium oxide and tetragonal or cubic zirconium oxide as a mixture, the zirconium oxide is composed of a solid solution containing cerium, a cerium oxide-zirconium oxide-based mixed oxide is obtained having superior platinum dispersibility and a suitable OSC.

The present invention provides the following on the basis of this finding.

1. A cerium oxide-zirconium oxide-based mixed oxide comprising cerium oxide and zirconium oxide, wherein (1) the weight ratio of $CeO_2:ZrO_2$ is 60:40 to 90:10, and (2) the cerium oxide and the zirconium oxide are present as a mixture, the zirconium oxide being composed of a solid solution in which tetragonal or cubic zirconium oxide contains cerium.

2. The cerium oxide-zirconium oxide-based mixed oxide according to above 1, wherein the ratio of the cerium oxide as calculated from the X-ray diffraction peak intensity after heat treatment for 3 hours at 1000° C. in air is 50% by volume or more.

3. The cerium oxide-zirconium oxide-based mixed oxide according to above 1 or 2, wherein the mixed oxide contains 1 to 20 wt % of one type or two or more types of oxides selected from rare earth elements excluding cerium, transition metal elements, aluminum and silicon.

4. A method for producing a cerium oxide-zirconium oxide-based mixed oxide comprising: a first step of adding a sulfating agent to a cerous salt to obtain a slurry containing a cerous sulfate-alkali metal mixed salt; a second step of adding a cerium salt and a zirconium salt to the slurry; a third step of adding an alkali to the mixture obtained in the second step to obtain a mixed hydroxide containing cerium hydroxide and zirconium hydroxide; and a fourth step of heat-treating the mixed hydroxide to obtain a mixed oxide containing cerium oxide and zirconium oxide.

5. The method for producing a cerium oxide-zirconium oxide-based mixed oxide according to above 4, wherein one type or two or more types of metal salt selected from rare earth elements excluding cerium, transition metal elements, aluminum and silicon is added in the second step.

According to the present invention, a cerium oxide-zirconium oxide-based mixed oxide, and a simple production process thereof, having superior platinum dispersibility and a suitable OSC, can be provided which can be preferably used in the relevant art as a co-catalyst or catalyst support and the like of an automotive three-way catalyst.

DESCRIPTION OF THE PREFERRED EMBODIMENTS

The following provides a detailed explanation of the cerium oxide-zirconium oxide-based mixed oxide and production process thereof of the present invention.

Furthermore, the zirconia referred to in the present invention refers to ordinary zirconia, and includes that containing impurity metal compounds, including hafnia, up to 10% by weight.

In addition, in the present invention, unless specifically stated otherwise, "%" refers to percent by weight.

1. Cerium Oxide-Zirconium Oxide-Based Mixed Oxide

The cerium oxide-zirconium oxide-based mixed oxide of the present invention is a cerium oxide-zirconium oxide-based mixed oxide comprising cerium oxide and zirconium oxide, wherein (1) the weight ratio of $CeO_2:ZrO_2$ is 60:40 to 90:10, and (2) the cerium oxide and the zirconium oxide are present as a mixture, the zirconium oxide being composed of a solid solution in which tetragonal or cubic zirconium oxide contains cerium.

First, the weight ratio of the cerium oxide and the zirconium oxide is $CeO_2$ to $ZrO_2$=60:40~90:10, preferably 63:35~85:15, and particularly preferably 70:30~80:20. If the ratio of cerium oxide is less than 60%, the ratio of the presence of cerium oxide decreases resulting in a high potential for a decrease in the dispersibility of Pt, while if the composite ratio exceeds 90%, OSC decreases thereby making this undesirable.

Next, "the cerium oxide and the zirconium oxide are present as a mixture, the zirconium oxide being composed of a solid solution in which tetragonal or cubic zirconium oxide contains cerium" indicates that, in terms of crystal chemistry, (1) cerium oxide phase and (2) tetragonal or cubic zirconium oxide phase which forms a solid solution containing cerium, namely the two peaks of cerium oxide and tetragonal or cubic zirconium oxide, are clearly recognized.

In terms of powder engineering, (1) cerium oxide phase and (2) tetragonal or cubic zirconium oxide phase which is composed of a solid solution containing cerium are equally mixed each other (as defined in the original Japanese in the Kojien, 2nd revised edition, Oct. 15, 1979, 4th printing). In other words, the zirconium oxide phase is dispersed in the cerium oxide phase basically in the present invention.

Thus, the "mixed oxide (B) comprised of cerium oxide merely loaded onto a solid solution oxide (A) containing zirconium and cerium" described in Japanese Patent Application Publication No. 2002-177781, and the "metal oxide particles having a core portion containing a comparatively large amount of a ceria-zirconia solid solution and a shell portion containing a comparatively large amount of a second metal oxide" described in Japanese Patent Application Publication No. 2005-314134 are not included in the present invention.

Figure 1:
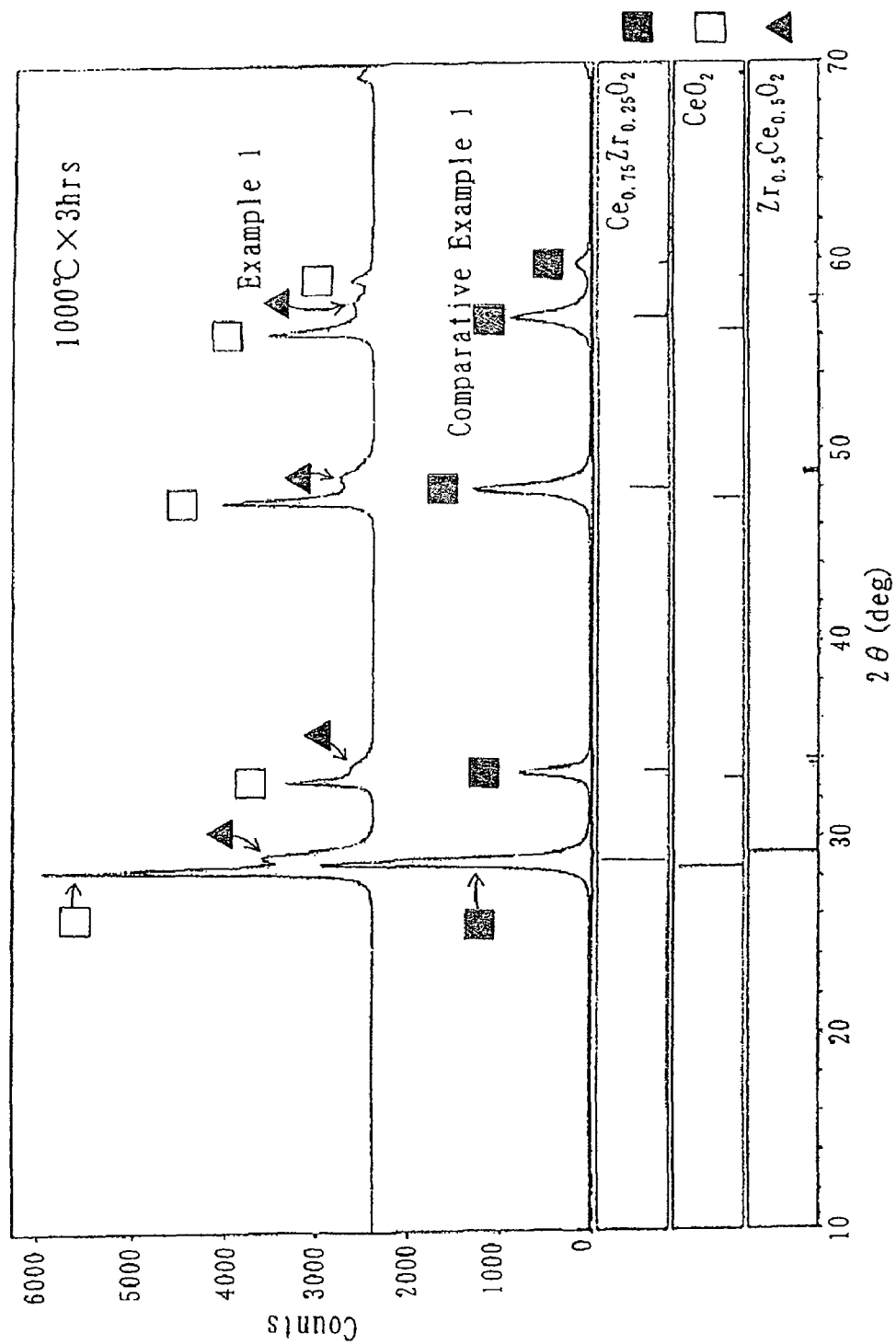
FIG. 1 shows the X-ray diffraction results of powders obtained by heat-treating oxides obtained in Example 1 and Comparative Example 1 for 3 hours at 1000° C.

Furthermore, for reference purposes, the results of X-ray diffraction of a powder obtained in Example 1 of the present invention are shown in FIG. 1.

According to this, (1) cerium oxide and (2) tetragonal or cubic zirconium oxide which is composed of a solid solution containing cerium, namely the two peaks of cerium oxide and tetragonal or cubic zirconium oxide can be seen to be clearly observed.

In this manner, since the cerium oxide-zirconium oxide-based mixed oxide of the present invention has the characteristics described above, it has the superior platinum dispersibility and suitable OSC described below.

The OSC of the cerium oxide-zirconium oxide-based mixed oxide of the present invention is 0.20 mmol-$O_2$/g or more and preferably 0.25 mmol-$O_2$/g or more. If the OSC is less than 0.20 mmol-$O_2$/g, the OSC of ceria actually functioning as an automotive catalyst decreases, thereby making this undesirable.

On the other hand, in the case of having loaded platinum onto the cerium oxide-zirconium oxide-based mixed oxide of the present invention following heat treatment for 3 hours at 900° C., the particle size of platinum is 200 nm or less and preferably 170 nm or less. If the particle size exceeds 200 nm, the number of active sites as a catalyst decreases, thus resulting in the possibility of a decrease in catalyst activity and making this undesirable.

Moreover, the content of cerium oxide as calculated from X-ray diffraction peak intensity of the cerium oxide-zirconium oxide-based mixed oxide of the present invention following heat treatment for 3 hours at 1000° C. in air is preferably 50% by volume or more, more preferably 60% by volume or more and particularly preferably 70% by volume or more. If this ratio of cerium oxide is less than 50% by volume, Pt dispersibility decreases, thereby making this undesirable.

In addition, the specific surface area of the cerium oxide-zirconium oxide-based mixed oxide of the present invention following heat treatment for 3 hours at 1000° C. in air is preferably 10 m²/g or more. If the specific surface area is less than 10 m²/g, there is the possibility of promoting sintering of the precious metal serving as the catalyst, thereby making this undesirable.

Furthermore, the cerium oxide-zirconium oxide-based mixed oxide of the present invention may also contain 1 to 20% by weight of one type or two or more types of oxides selected from the group consisting of oxides of rare earth elements excluding cerium, transition metal elements, aluminum and silicon.

Examples of rare earth elements other than cerium include lanthanoid elements such as Sc, Y, La, Pr or Nd. Examples of transition metal elements include Ti, Cr, Mn, Fe, Co, Ni, Cu, Mo and W. If these metal oxides are contained at less than 1% by weight, there is no effect of improving heat resistance, while if contained in excess of 20% by weight, the ratio of $CeO_2$ decreases and the cubic crystal ratio of the cerium oxide decreases, thereby making this undesirable.

2. Method for Producing Cerium Oxide-Zirconium Oxide-Based Mixed Oxide (First Step)

First, in the present invention, a sulfating agent is added to a cerous salt to obtain a slurry containing a cerousسulfate-alkali metal mixed salt.

The cerous salt may be that which provides cerous ion, and for example, one type or two or more types of cerous sulfate, cerous chloride or cerous nitrate can be used. Although the solvent is suitably selected according to the type of cerium salt used and the like, it is normally desirable to use water (and preferably pure water or ion exchange water).

Although there are no particular limitations on the concentration of the cerium salt solution, typically it is preferably 5 to 200 g, and particularly preferably 50 to 100 g, of cerium oxide ($CeO_2$) equivalent in 1000 g of solvent.

A sulfating agent that forms a cerous sulfate-alkali metal mixed salt by reacting with cerous ion is preferably used for the sulfating agent, examples of which include sodium sulfate and potassium sulfate.

The sulfating agent may be in the form of, for example, a powder or a solution, and is preferably used in the form of a solution (and particularly preferably an aqueous solution). The concentration in the case of using as a solvent can be suitably set.

For example, the sulfating agent is added so that the weight ratio of $Na_2SO_4/CeO_2$ in the case of using $Na_2SO_4$ is 1.5 to 2.5, and the free acid concentration of the mixture is preferably 0.2 to 2.2 N (normal).

Although examples of free acids include, but are not particularly limited to, sulfuric acid, nitric acid and hydrochloric acid, hydrochloric acid is preferable from the standpoint of having superior productivity on an industrial scale.

After having added the sulfating agent to the cerous salt, this solution is heated to 85° C. or higher and held (aged) at that temperature for a fixed period of time to form a cerous sulfate-alkali metal mixed salt.

There are no particular limitations on the cerous sulfate-alkali metal mixed salt, and examples include $Ce_2(SO_4)_3 \cdot 2M_2SO_4$ and $M_3[Ce_2(SO_4)_3]$ (wherein M represents an alkali metal).

In this manner, a slurry can be obtained containing a cerous sulfate-alkali metal mixed salt.

Although the resulting cerous sulfate-alkali metal mixed salt may be filtered or rinsed with water and the like for the purpose of solid-liquid separation as necessary, since the present invention comprises a subsequent step, it can normally be used in the next step without filtering.

In the present invention, it is clear that a cerous sulfate-alkali metal mixed salt can be used directly as a starting substance, and this case is also included in the scope of the present invention.

(Second Step)

Next, a cerium salt and a zirconium salt are added to the slurry obtained in the first step.

The cerium salt may be either a cerous salt or a ceric salt provided it provides cerium ion. For example, one type or two or more types of cerium salts such as cerium sulfate, cerium chloride or cerium nitrate can be used.

In addition, the zirconium salt may be any zirconium salt provided it provides zirconium ion, and for example, one type or two or more types of zirconium salts such as zirconium oxynitrate, zirconium oxychloride or zirconium nitrate can be used.

Although there are no particular limitations on the concentration of the cerium salt, typically it is preferably 5 to 200 g, and particularly preferably 50 to 100 g, as cerium oxide ($CeO_2$) in 1000 g of solvent.

In addition, this applies similarly to the concentration of the zirconium salt.

In order to maintain a certain constant OSC at 600° C. for the cerium oxide-zirconium oxide-based mixed oxide of the present invention, it is necessary for tetragonal or cubic zirconium oxide composed of a solid solution containing cerium to be present in addition to the cerium oxide.

Consequently, the ratio of the cerium salt and zirconium salt is preferably, as oxide equivalent, such that $CeO_2$:$ZrO_2$=40 to 60:60 to 40, and particularly preferably $CeO_2$:$ZrO_2$=50:50.

Furthermore, although there are no particular limitations thereon, in the case of adding cerium salt and zirconium salt at a ratio of $CeO_2$:$ZrO_2$=40:60 of oxide equivalent when the amount of $CeO_2$ contained in the slurry containing a cerous sulfate-alkali metal salt is defined as X and the amount of oxide ($CeO_2+ZrO_2$) in the added cerium salt and zirconium salt is defined as Y, in order to make the ratio of $CeO_2$ to $ZrO_2$ (weight ratio) in the cerium oxide-zirconium oxide-based mixed oxide of the present invention 60:40 to 90:10, the weight ratio of X and Y is such that X:Y is within the range of 1:2 to 5:1.

Furthermore, although the cerium oxide-zirconium oxide-based mixed metal oxide of the present invention can contain 1 to 20% of one type or two or more types of oxides selected from oxides of rare earth elements excluding cerium, transition metal elements, aluminum and silicon, in this case, this can be accommodated in the present step by adding a prescribed amount of one type or two or more types of a metal salt selected from the group consisting of metal salts of rare earth elements excluding cerium, transition metal elements, aluminum and silicon.

(Third Step)

An alkali is added to the slurry containing a cerous sulfate-alkali metal mixed salt to which was added a cerium salt and a zirconium salt prepared in the second step to obtain a mixed hydroxide containing cerium hydroxide and zirconium hydroxide.

There are no particular limitations on the alkali. Examples of alkalis that can be used include ammonium hydroxide, ammonium bicarbonate, sodium hydroxide and potassium hydroxide.

Among these, sodium hydroxide is preferable for the reason that it can be inexpensively used industrially.

There are no particular limitations on the amount of alkali added provided it is able to cause the formation of a precipitate from the aforementioned solution, and is normally such that the pH of the solution is 11 or higher and preferably 12 or higher.

This neutralization step, namely the neutralization of a solution in which three components consisting of solid cerium salt, ionic cerium salt (cerium ion) and ionic zirconium salt (zirconium ion) are all present, is the major characteristic of the present invention, and the cerium oxide-zirconium oxide-based mixed metal oxide of the present invention, comprising "a mixture of cerium oxide and tetragonal or cubic zirconium oxide which is a solid solution comprising cerium", can be produced by heat treating the mixed hydroxide containing cerium hydroxide and zirconium hydroxide obtained in this step.

Although this mechanism is not completely understood, it is presumed to be as described below.

Namely, by respectively using (1) a solid cerium salt and (2) an ionic cerium salt, the degree of the mixing of the cerium salts and zirconium can be controlled. In other words, the (2) ionic cerium salt coprecipitates with ionic zirconium salt in the step comprising addition of alkali resulting in a hydroxide in which Ce and Zr are dispersed well. On the other hand, since the (1) solid cerium salt is already in the form of aggregated particles and not in an ionic state, dispersion with zirconium ion is not adequate, resulting in a hydroxide which is difficult to mixed in the neutralization step.

Thus, the hydroxide formed in the neutralization step is a hydroxide in which cerium hydroxide from (1) and cerium hydroxide and zirconium hydroxide from (2) are dispersed well, and by then undergoing firing, a mixed oxide powder containing cerium oxide is thought to be formed.

Furthermore, after completion of the neutralization reaction, it is preferable to maintain the solution containing the mixed hydroxide containing cerium hydroxide and zirconium hydroxide at 35 to 60° C. for 1 hour or more from the viewpoint of aging the resulting precipitate to facilitate separation by filtration.

The formed precipitate composed of the mixed hydroxide containing cerium hydroxide and zirconium hydroxide is then recovered by a solid-liquid separation method. Solid-liquid separation may be carried out in accordance with known methods such as filtration, centrifugal separation and decantation. Following recovery of the precipitate, the mixed hydroxide containing cerium hydroxide and zirconium hydroxide is preferably washed with water to remove any adhered impurities as necessary.

Furthermore, the resulting mixed hydroxide may be further dried as necessary. Drying may be carried out in accordance with a known method such as air drying or heat drying. In addition, the mixed hydroxide may be subjected to grinding treatment, classification treatment and the like as necessary following drying treatment.

(Fourth Step)

Finally, a cerium oxide-zirconium oxide-based mixed oxide is obtained by carrying out heat treatment on the mixed hydroxide containing cerium hydroxide and zirconium hydroxide.

There are no particular limitations on the heat treatment, and it may be normally carried out at about 400 to 900° C. for 1 to 5 hours.

There are no particular limitations on the heat treatment atmosphere, and heat treatment may be normally carried out in air or an oxidizing atmosphere.

Furthermore, a mixed oxide obtained in this manner can be crushed as necessary. There are no particular limitations on the crushing, and it may be normally carried out with a crushing machine such as a planetary mill, ball mill or jet mill.

EXAMPLES

The following provides a further explanation of the characteristics of the present invention by indicating examples thereof. Furthermore, the present invention is not limited to these examples.

Each of the physical properties was measured using the methods indicated below in the examples.

(1) Specific Surface Area

Specific surface area was measured according to the BET method using a specific surface area measuring instrument (Flowsorb II, Micromeritics Corp.).

(2) Oxygen Storage Capacity (OSC)

$H_2$-TPR was determined according to the Temperature Programmed Reduction method (Multitask T.P.R., Bel Japan Inc.).

More specifically, 0.3 g of powder were sufficiently oxidized by heating to 600° C. and holding for 60 minutes in highly pure oxygen gas. Next, the powder was heated to from 100 to 900° C. at a heating rate of 10° C./min in a 5% hydrogen-argon gas flow (100 sccm), and the hydrogen consumed during this time was measured continuously with a quadrupole mass spectrometer to obtain a water vapor generation curve accompanying the rise in temperature. The area under the resulting hydrogen consumption curve for the amount of hydrogen consumed at 600° C. was taken to be amount of oxygen released at 600° C.

(3) Cerium Oxide Ratio

The cerium oxide ratio was defined in the manner indicated below from powder X-ray diffraction data following heat treatment for 3 hours at 1000° C. when the diffraction intensity of 2θ:28.55° equivalent to the (111) plane of cubic cerium oxide is defined as $I_0$, and the diffraction intensity of 2θ:30.5° or 30.2° equivalent to the (111) plane of cubic or tetragonal zirconium oxide is defined as $I_1$.

Cerium oxide ratio (vol %)=$I_0/(I_0+I_1)$×100

(4) Platinum Particle Size

Figure 3:
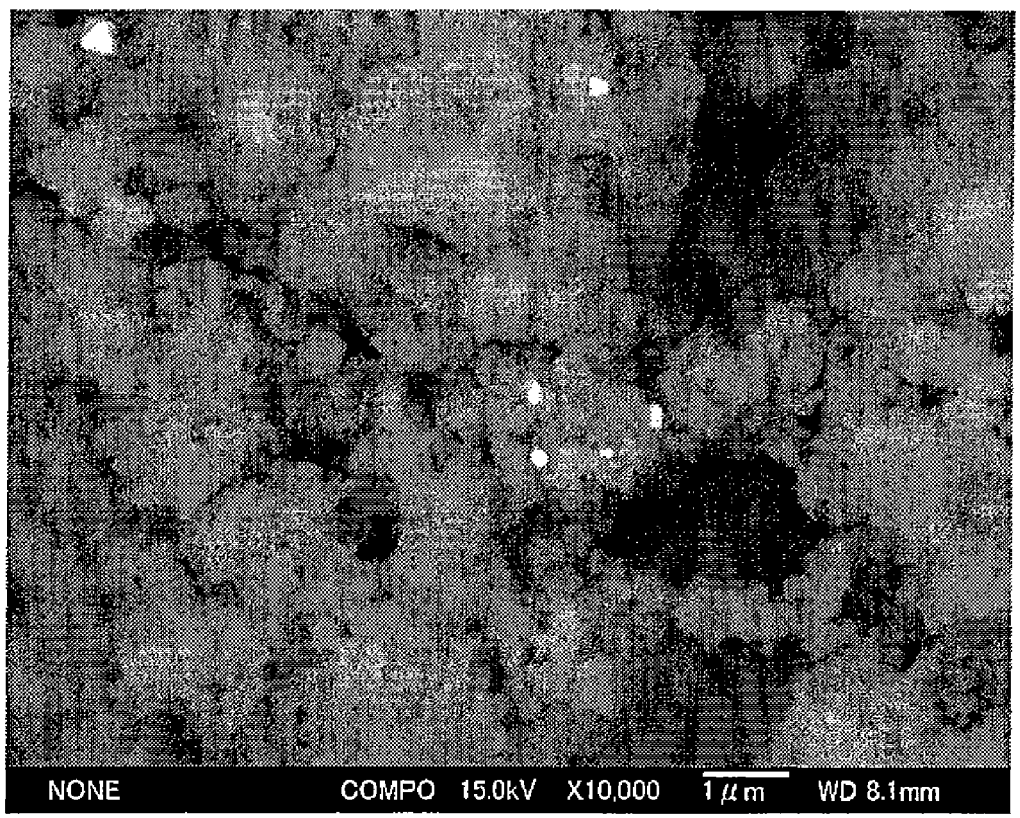
FIG. 3 shows an SEM image of a powder obtained by loading the oxide obtained in Example 1 with 1 wt % Pt followed by heat treating for 3 hours at 900° C.
Figure 4:
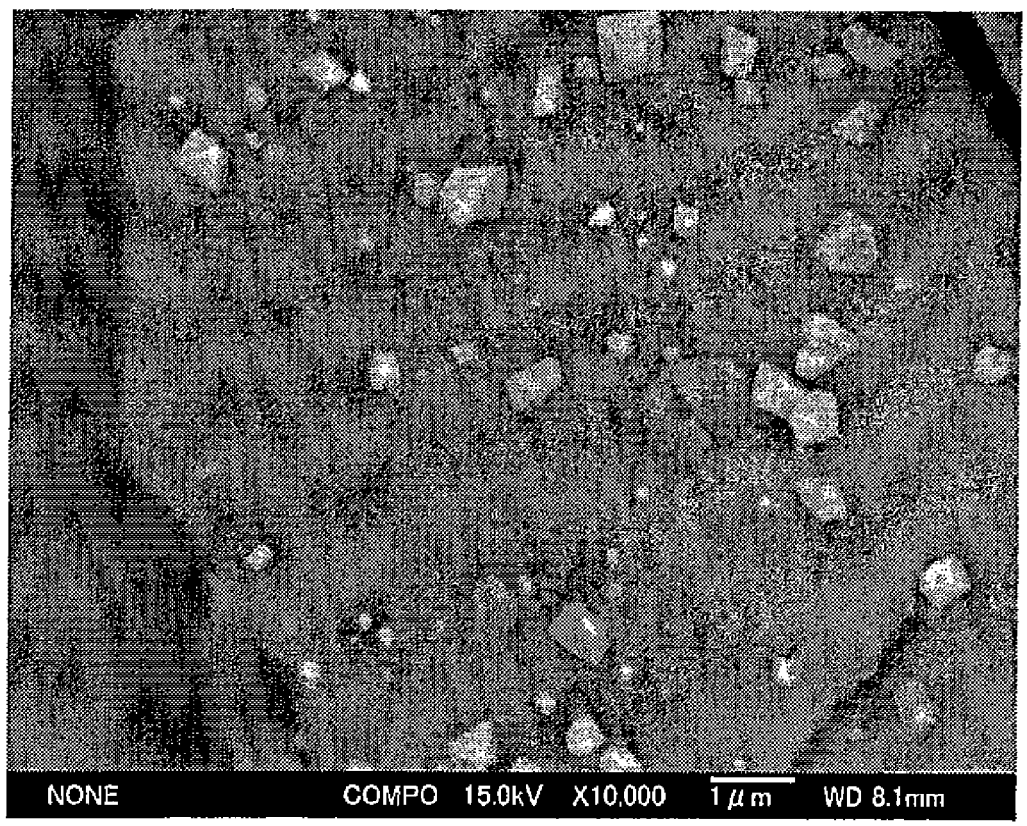
FIG. 4 shows an SEM image of a powder obtained by loading the oxide obtained in Comparative Example 1 with 1 wt % Pt followed by heat-treating for 3 hours at 900° C.

Pt particles (white spots in FIGS. 3 and 4) observed by SEM-EDX were measured by visualizing under a scanning electron microscope followed by determination of the average value.

Example 1

280 g of a 20% cerous nitrate solution (containing 56 g of $CeO_2$ equivalent) were heated to 85° C. followed by the addition of 624 g of a 25% sodium sulfate solution (containing 156 g of $Na_2SO_4$ equivalent) and holding for 1 hour at 85° C. to obtain a slurry containing cerous sulfate-sodium mixed salt.

110 g of a 20% zirconium nitrate solution (containing 22 g of $ZrO_2$ equivalent) and 110 g of a 20% cerous nitrate solution (containing 22 g of $CeO_2$ equivalent) were added to this basic slurry containing cerous sulfate-sodium mixed salt.

This solution was then neutralized using 500 g of 25% sodium hydroxide. The pH at this time was 12 or higher.

Continuing, a hydroxide was obtained by filtering and rinsing with water.

The resulting hydroxide was then fired for 5 hours at 650° C. in air to obtain an oxide.

The X-ray diffraction results for the resulting oxide are shown in FIG. 1.

In addition, the specific surface area, specific surface area following heat treatment for 3 hours at 1000° C., the cerium oxide ratio and OSC were determined for this oxide.

On the other hand, Pt was loaded onto this oxide followed by determination of platinum particle size. In this case, Pt was loaded by dispensing a dinitrodiamine platinum nitrate solution (Pt: 4.5%) into the oxide to 1% by weight followed by impregnating and drying for 5 hours at 500° C.

Figure 2:
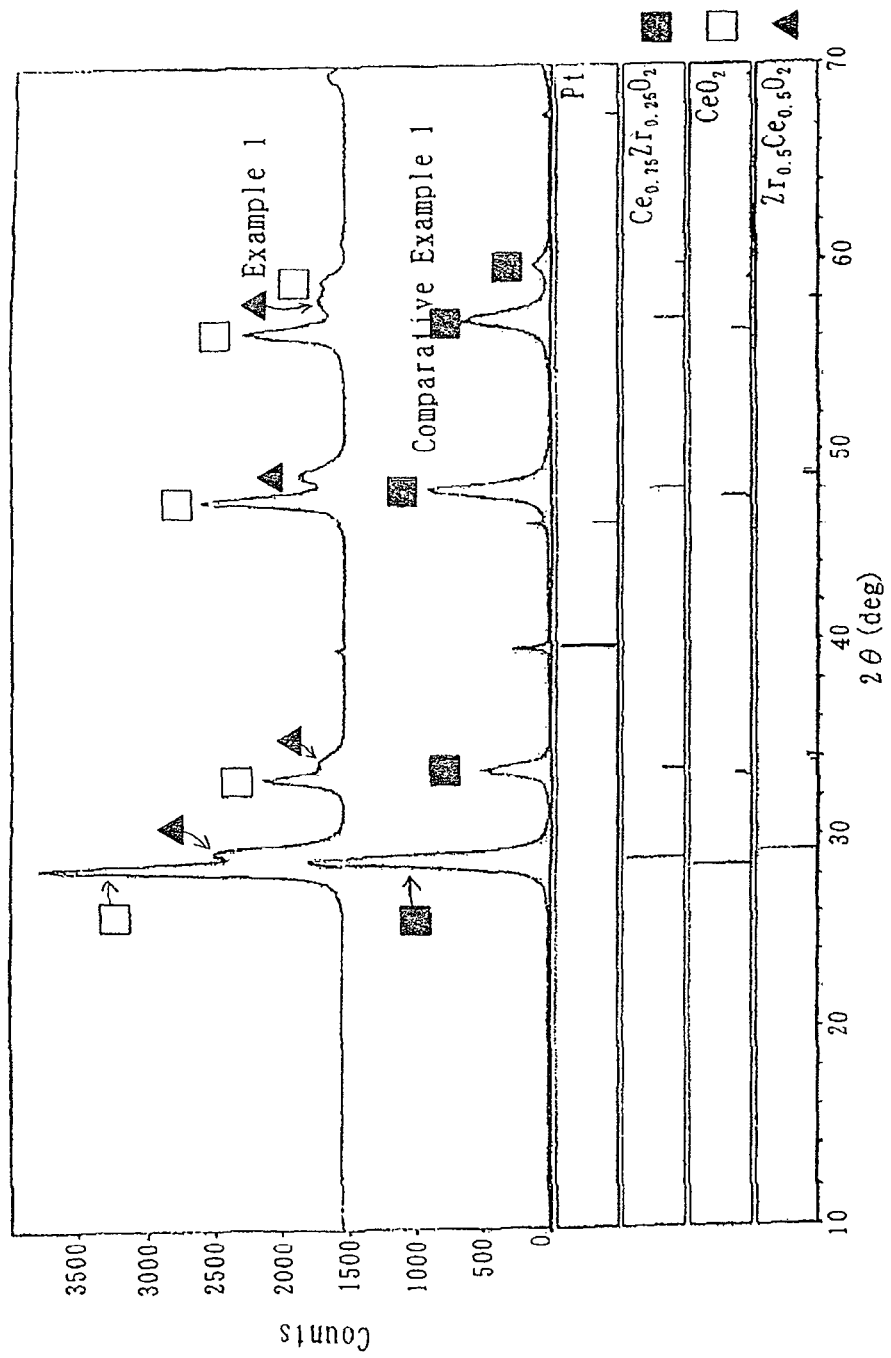
FIG. 2 shows the X-ray diffraction results of powders obtained by loading the oxides obtained in Example 1 and Comparative Example 1 with 1 wt % Pt followed by heat treating for 3 hours at 900° C.

Moreover, the X-ray diffraction results after heat treating for 3 hours at 900° C. in air are shown in FIG. 2.

These results are shown in Table 1 along with analysis values.

Comparative Example 1

20% zirconium nitrate solution (containing 22 g of $ZrO_2$ equivalent) and 390 g of a 20% cerium nitrate solution (containing 78 g of $CeO_2$ equivalent) were mixed.

This solution was then neutralized using 500 g of 25% ammonia. The pH at this time was 10.1. Continuing, a hydroxide was obtained by filtering and rinsing with water.

The resulting hydroxide was fired for 5 hours at 650° C. in air to obtain an oxide.

This oxide was subjected to the same measurements as Example 1. Those results are shown in Table 1 along with analysis values. Furthermore, X-ray diffraction results for the resulting oxide are shown in FIG. 1.

Furthermore, platinum was loaded followed by determination of platinum particle size in the same manner as Example 1.

Moreover, the X-ray diffraction results following heat treatment for 3 hours at 900° C. in air are shown in FIG. 2.

TABLE 1

Analysis Values and Measurement Results

| | Example 1 | Comparative Example 1 |
|---|---|---|
| $ZrO_2$ (wt %) | 22.0 | 22.0 |
| $CeO_2$ (wt %) | 78.0 | 78.0 |
| SA (m²/g) | 65.7 | 69.1 |
| Aged SA[*1] (m²/g) | 14.4 | 20.2 |
| Cerium oxide ratio (vol %) | 80.6 | 5.5 |
| Platinum particle size after heat treatment at 900° C. (nm) | Approx. 170 | Approx. 350 |
| OSC (mmol-$O_2$/g) | 0.25 | 0.31 |

[*1]: After heat treatment for 3 hours at 1000° C.

According to Table 1, the article of the present invention was determined to have a suitable OSC of 0.25 mmol-$O_2$/g, and the cerium oxide ratio of 80.6 vol % was found to be much higher than the comparative example.

The platinum particle size of approximately 170 nm following heat treatment for 3 hours at 900° C. was not more than half of that of the comparative example.

These results indicated that, in the case of assuming an equal amount of loaded platinum and formation of platinum crystallites of the same particle size, the product of the present invention is about 8.7 times greater ($(350/170)^3$) in terms of quantity (number of particles) and about 2.1 times greater (350/170) in terms of specific surface area, thus demonstrating extremely superior dispersibility.

What is claimed is:

1. A method for producing a cerium oxide-zirconium oxide-based mixed oxide comprising:
    a first step of adding a sulfating agent to a cerous salt to obtain a slurry containing a cerous sulfate-alkali metal mixed salt;
    a second step of adding a cerium salt and a zirconium salt to the slurry;
    a third step of adding an alkali to the mixture obtained in the second step to obtain a mixed hydroxide containing (a) cerium hydroxide and (b) zirconium hydroxide mixed with cerium hydroxide; and
    a fourth step of heat-treating the mixed hydroxide to obtain a mixed oxide containing (a) cerium oxide and (b) zirconium oxide solid solution containing cerium;
    the cerium oxide-zirconium oxide-based mixed oxide comprising (a) cerium oxide and (b) zirconium oxide solid solution containing cerium, wherein (1) the weight ratio of $CeO_2$: $ZrO_2$ is 60:40 to 90:10, (2) (a) the cerium oxide and the zirconium oxide solid solution containing cerium are present as a mixture, (b) the zirconium oxide solid solution containing cerium is tetragonal or cubic, and (3) in the case of having loaded platinum onto the cerium oxide-zirconium zirconium oxide-based mixed oxide following heat treatment for 3 hours at 900° C., the particle size of platinum is 200 nm or less.

2. The method for producing a cerium oxide-zirconium oxide-based mixed oxide according to claim 1, wherein one type or two or more types of metal salt selected from rare earth elements excluding cerium, transition metal elements, aluminum and silicon is added in the second step;
    the cerium oxide-zirconium oxide-based mixed oxide contains 1 to 20 wt% of one type or two or more types of oxides selected from rare earth elements excluding cerium, transition metal elements, aluminum and silicon.

3. A method for producing a cerium oxide-zirconium oxide-based mixed oxide comprising:
    a first step of adding a sulfating agent to a cerous salt to obtain a slurry containing a cerous sulfate-alkali metal mixed salt;
    a second step of adding a cerium salt and a zirconium salt to the slurry;
    a third step of adding an alkali to the mixture obtained in the second step to obtain a mixed hydroxide containing (a) cerium hydroxide and (b) zirconium hydroxide mixed with cerium hydroxide; and
    a fourth step of heat-treating the mixed hydroxide to obtain a mixed oxide containing (a) cerium oxide and (b) zirconium oxide solid solution containing cerium;
    the cerium oxide-zirconium oxide-based mixed oxide comprising (a) cerium oxide and (b) zirconium oxide solid solution containing cerium, wherein (1) the weight ratio of $CeO_2$: $ZrO_2$ is 60:40 to 90:10, (2) in terms of X-ray diffraction, (a) cerium oxide phase and (b) tetragonal or cubic zirconium oxide solid solution containing cerium phase, namely the two peaks of (a) cerium oxide and (b) tetragonal or cubic zirconium oxide solid solution containing cerium, are clearly recognized, (3) in the case of having loaded platinum onto the cerium oxide-zirconium oxide-based mixed oxide following heat treatment for 3 hours at 900° C., the particle size of platinum is 200 nm or less.

4. The method for producing a cerium oxide-zirconium oxide-based mixed oxide according to any one of claims 1 to 3;
    wherein the ratio of the cerium oxide as calculated from the X-ray diffraction peak intensity after heat treatment for 3 hours at 1000° C. in air is 50% by volume or more.

5. The method for producing a cerium oxide-zirconium oxide-based mixed oxide according to claim 3;
    wherein one type or two or more types of metal salt selected from rare earth elements excluding cerium, transition metal elements, aluminum and silicon is added in the second step;
    the cerium oxide-zirconium oxide-based mixed oxide contains 1 to 20 wt% of one type or two or more types of oxides selected from rare earth elements excluding cerium, transition metal elements, aluminum and silicon.

* * * * *